United States Patent
Sun et al.

(10) Patent No.: US 9,214,974 B2
(45) Date of Patent: Dec. 15, 2015

(54) METHOD FOR SENSING WIRELESS MICROPHONES USING AUGMENTED SPECTRAL CORRELATION FUNCTION

(75) Inventors: Huanhuan Sun, Anhui (CN); Wenyi Zhang, Anhui (CN); Taitai Zhang, Anhui (CN)

(73) Assignee: University of Science and Technology of China, Hefei (CN)

(*) Notice: Subject to any disclaimer, the term of this patent is extended or adjusted under 35 U.S.C. 154(b) by 0 days.

(21) Appl. No.: 13/984,223

(22) PCT Filed: May 23, 2012

(86) PCT No.: PCT/CN2012/075940
§ 371 (c)(1),
(2), (4) Date: Aug. 7, 2013

(87) PCT Pub. No.: WO2013/097409
PCT Pub. Date: Jul. 4, 2013

(65) Prior Publication Data
US 2013/0308730 A1    Nov. 21, 2013

(30) Foreign Application Priority Data
Dec. 31, 2011 (CN) .......................... 2011 1 0459654

(51) Int. Cl.
*H04B 1/16* (2006.01)
*H04L 27/00* (2006.01)
(52) U.S. Cl.
CPC .............. *H04B 1/16* (2013.01); *H04L 27/0006* (2013.01)

(58) Field of Classification Search
USPC ......................... 375/343, 350, 130
See application file for complete search history.

(56) References Cited

U.S. PATENT DOCUMENTS

| | | | |
|---|---|---|---|
| 7,593,449 B2* | 9/2009 | Shattil ........................... | 375/130 |
| 2007/0241985 A1* | 10/2007 | Suzuki et al. ................. | 343/860 |
| 2008/0112519 A1* | 5/2008 | Jung et al. ..................... | 375/350 |

FOREIGN PATENT DOCUMENTS

| WO | 2010134978 A1 | 11/2010 |
|---|---|---|
| WO | 2011020179 A1 | 2/2011 |

OTHER PUBLICATIONS

Search Report and Written Opinion for WO2013/097409 A1.

* cited by examiner

*Primary Examiner* — Eva Puente
(74) *Attorney, Agent, or Firm* — McDonnell Boehnen Hulbert & Berghoff LLP (57) ABSTRACT

A method for detecting wireless microphone signals based on an augmented spectral correlation function is provided. The method includes obtaining an augmented spectral correlation function (SCF) of acquired digital signals based on a SCF of the digital signal and a conjugate SCF proposed in the present invention, calculating a statistic, and comparing it with a decision threshold simulated or calculated through a predetermined method to determine whether the digital signal is a wireless microphone signal. With the proposed augmented SCF, the present invention overcomes a difficulty in sensing TV white space, namely, the inability of most existing detection methods to effectively distinguish between narrowband interferences and wireless microphone signals. Meanwhile, the detection method has low algorithm complexity and is easy to implement in real systems.

10 Claims, 5 Drawing Sheets

METHOD FOR SENSING WIRELESS MICROPHONES USING AUGMENTED SPECTRAL CORRELATION FUNCTION

CROSS-REFERENCE TO RELATED APPLICATIONS

This application is a U.S. National Stage Entry of International Application No. PCT/CN2012/075940, filed on May 23, 2012, which claims the benefit of Chinese Application No. 201110459654.7 filed on Dec. 31, 2011, each of which is incorporated herein in its entirety.

TECHNICAL FIELD

The present invention relates to the field of cognitive radio technology, and more particularly, to sensing of low-power wireless microphone signals in digital TV white space.

BACKGROUND

The Federal Communications Committee of USA specifies that devices for sensing TV white space should be capable of detecting wireless microphone signals at a received power level −107 dbm. At such a low power level, continuous wave narrowband interference caused by spurious emissions, leakage, intermodulation and the like are quite similar to microphone signals. The inability for most existing detection methods to effectively distinguish between wireless microphone signals and narrowband interferences has led to an excessively high false alarm rate and thus severely limited the utility of sensing-based cognitive transmission in the TV white space spectrum.

SUMMARY

The present invention provides a method for detecting wireless microphone signals based on an augmented spectral correlation function, which solves the problem that most existing detection methods cannot effectively distinguish between wireless microphone signals and narrowband interferences, which has led to a high false alarm rate and a reduced number of available TV white spaces.

The objects of the present invention are achieved by the following solutions.

A method for detecting a wireless microphone signal based on an augmented spectral correlation function, includes two steps:

step 1 of obtaining a digital signal at a frequency to be detected, including sending signals received by an antenna module to a low noise amplifier, filtering the amplified signals with a bandpass filter whose bandwidth may be adjusted as required, sending the filtered signals to an orthogonal down-converter and down-converting the signals with a local oscillation frequency of the desired TV band to obtain I and Q signals; sending each of the two signals to a specific bandwidth low-pass filter and gain controller, sending the resultant I and Q signals to an analog-to-digital converter (ADC), sending the outputs of ADC to a time-domain signal preprocessing module which accomplishes the preprocessing operations of the signals, such as receiving, down-sampling, down-converting, IQ combining and storing, then scanning the frequency-domain signals to obtain the frequency point to be detected, and thus obtaining the digital signal at the frequency to be detected;

step 2 of detecting the wireless microphone signal using the augmented spectral correlation function, including obtaining the augmented spectral correlation function $\hat{S}_x^\alpha(f)_a$ based on a spectral correlation function $\hat{S}_x^\alpha(f)$ and a conjugate spectral correlation function $\hat{S}_x^\alpha(f)_c$ of the obtained digital signal x[n] using the following computation formulae:

$$\hat{S}_x^\alpha(f)_a = \kappa_1 \hat{S}_x^\alpha(f)\big|_{\alpha=0} + \kappa_2 \hat{S}_x^\alpha(f)_c\big|_{\alpha\neq 0} \quad (1)$$

$$\hat{S}_x^\alpha(f) = \frac{1}{MN} \sum_{k=-(M-1)/2}^{(M-1)/2} X\left(f + \frac{k}{N} + \frac{\alpha}{2}\right) \cdot X^\dagger\left(f + \frac{k}{N} - \frac{\alpha}{2}\right), \quad (2)$$

$$\hat{S}_x^\alpha(f)_c = \frac{1}{MN} \sum_{k=-(M-1)/2}^{(M-1)/2} X\left(f + \frac{k}{N} + \frac{\alpha}{2}\right) \cdot X^\dagger\left(f - \frac{k}{N} - \frac{\alpha}{2}\right), \quad (3)$$

where M is a positive odd number and M≤N, X(f) represents Discrete Time Fourier Transform (DTFT) of x[·] and $$X(f) = \sum_{n=0}^{N-1} x[n] e^{-j2\pi f n};$$

making a decision by using a suitable statistic, such as the following statistic:

$$T_a = 1 - \frac{|\Psi| \sum_{a\in\Omega} |\hat{S}_x^\alpha(f)_a|\Big|_{f=0}}{|\Omega| \sum_{f\in\Psi} |\hat{S}_x^\alpha(f)_a|\Big|_{a=0}} \quad (4)$$

where $\Psi$ represents a frequency range of f in $|\hat{S}_x^{\alpha=0}(f)_a|$, $\Omega$ represents a cyclic frequency range of $\alpha$ in $|\hat{S}_x^\alpha(f=0)_a|$; with a decision threshold $\gamma$ at a specific false alarm rate obtained by a predetermined simulation method; the rule is set as: if $T_a \leq \gamma$, the digital signal is a narrowband interference, otherwise it is a wireless microphone signal.

The present invention has advantages. By introducing the conjugate spectral correlation function and creating the augmented spectral correlation function by combination of the conjugate spectral correlation function and the spectral correlation function, the present invention provides a method for sensing the wireless microphone signal based on the augmented spectral correlation function. The method can effectively distinguish wireless microphone signals from narrowband interferences, and thus considerably reduce the false alarm rate caused by the narrowband interferences. The method also has the advantage of low complexity.

DETAILED DESCRIPTION OF THE EMBODIMENTS

Figure 1:
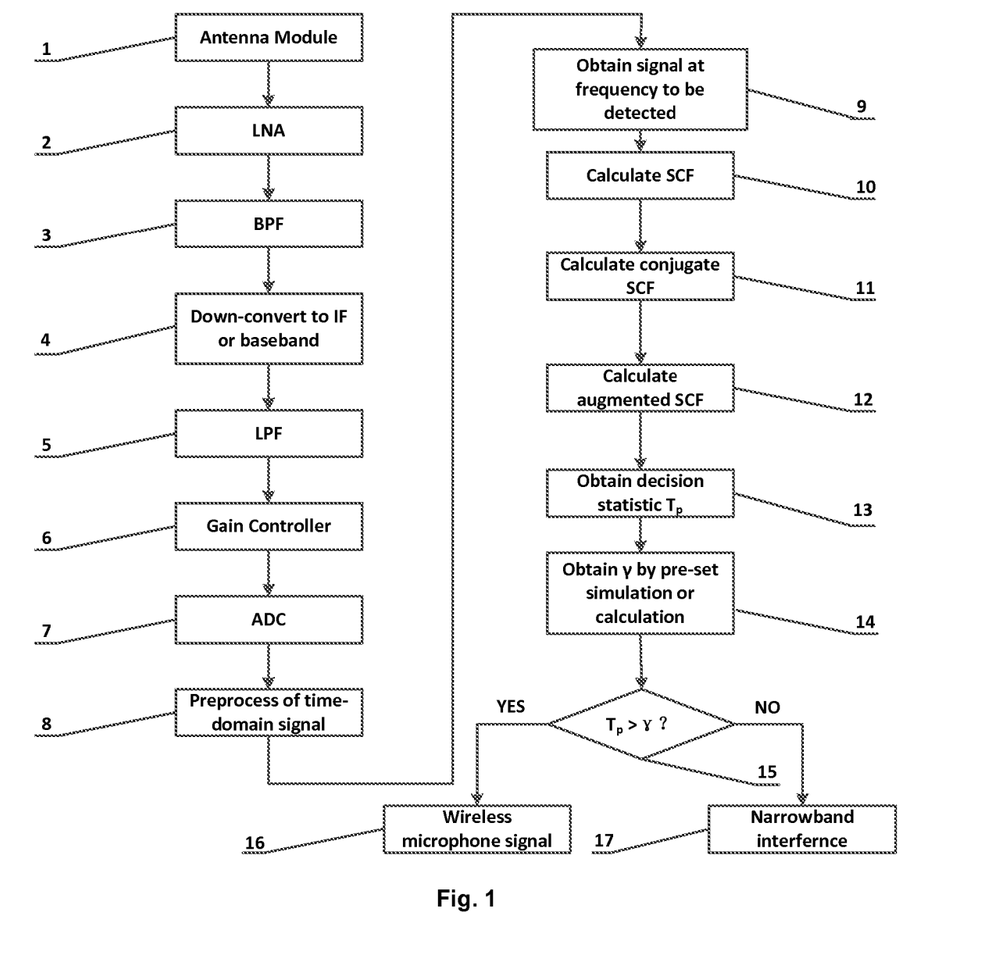
FIG. 1 is a schematic flowchart showing a method for detecting a wireless microphone signal based on an augmented spectral correlation function according to a specific embodiment of the present invention.

The present embodiment provides a method for detecting wireless microphone signals based on the augmented spectral correlation function. As shown in FIG. 1, the method includes:

Step 1, receive air wireless signals by an antenna module;

Step 2, amplify the received signals with a LNA;

Step 3, filter the amplified signals with a band-pass filter;

Step 4, if necessary, down-convert the filtered signals to an intermediate or base frequency with an orthogonal down-converter;

Step 5, filter the outputs of the orthogonal down-converter (I and Q signals) with low-pass filters;

Step 6, send the outputs of the low-pass filters to a gain controller for gain adjustment;

Step 7, send the gain-adjusted signals to an ADC for analog to digital conversion;

Step 8, send the digital signals that come from the ADC to a time-domain signal preprocessing module which accomplishes the preprocessing operations, such as receiving, down-sampling, down-converting, IQ combining and storing, and then obtain non-overlapping or partially-overlapping M segments of time-domain digital signals required for detection;

Step 9, scan the obtained time-domain digital signal to obtain the frequency to be detected;

Step 10, calculate a spectral correlation function of the digital signal at the frequency to be detected according to the formula (2);

Step 11, calculate a conjugate spectral correlation function of the digital signal at the frequency to be detected according to the formula (3);

Step 12, obtain an augmented spectral correlation function of the digital signal at the frequency to be detected according to the formula (1);

Step 13, calculate a statistic $T_p$ for decision-making according to, for example, the formula (4);

Step 14, obtain a threshold γ by simulation or calculation through a predetermined method;

Step 15, make a decision based on the result of comparison between $T_p$ and γ, i.e., the digital signal is a narrowband interference if $T_p \leq \gamma$, otherwise, it is a wireless microphone signal.

By introducing the conjugate spectral correlation function and proposing the augmented spectral correlation function by combination of the conjugate spectral correlation function and the spectral correlation function, the present embodiment provides a method for sensing the wireless microphone signal based on the augmented spectral correlation function. The method utilizes the feature of the augmented spectral correlation function to properly distinguish between a sine continuous wave (to simulate narrowband interference) and a wireless microphone signal, and thus accurately determines whether there is a wireless microphone signal in the current channel. This provides a basis for making full and efficient use of TV white space.

Firstly, the signals received by the antenna module 101 are sent to the low noise amplifier (LNA) 102. The amplified signals are passed through the band-pass filter (BPF) 103 whose bandwidth may be adjusted as required. Then, the filtered signals are provided to the orthogonal down-converter 105 where performs the orthogonal down-conversion with a local oscillator 104 frequency of the desired TV band to obtain I and Q signals. The two signals are passed through a specific bandwidth low-pass filter (LPF) 106 and the intermediate frequency amplifier (IF Amp) 107, respectively. And then the I and Q signals that come from the IF Amp are sent to the analog-to-digital converter (ADC) 109. Finally, the two digital signals that come from the ADC 109 are provided to the FPGA 110, in which accomplishes the signal preprocessing operations, such as receiving, down-sampling, down-converting, IQ combining and storing, thus obtaining the time-domain digital signals required for detection. By modeling the narrowband interference with a sinusoidal continuous wave, the binary hypothesis testing problem is given by:

$$H_1(\text{wireless\_microphone\_signal}): x[n]\frac{A}{2}e^{j\left(2\pi\beta\int_0^{nT_s}m(\tau)d\tau+\varphi\right)} + \omega[n], \quad (1)$$

$$H_2(\text{sine\_continuous\_wave\_signal}): x[n] = \frac{A}{2}e^{j\varphi} + \omega[n], \quad (2)$$

Herein ω[·] denotes bandlimited white circularly-symmetric complex Gaussian noise, with variance denoted by $\sigma^2$. The signal to noise ratio (SNR) is therefore SNR=$A^2/(4\sigma^2)$.

For a given digital signal x[n], n=1, 2, ..., N−1, the formula for calculating the spectral correlation function (SCF) is:

$$\hat{S}_x^\alpha(f) = \frac{1}{MN}\sum_{k=-(M-1)/2}^{(M-1)/2} X\left(f + \frac{k}{N} + \frac{\alpha}{2}\right) \cdot X^\dagger\left(f + \frac{k}{N} - \frac{\alpha}{2}\right), \quad (3)$$

where M is a positive odd number and M≤N, X($f$) represents Discrete Time Fourier Transform (DTFT) of [·].

$$X(f) = \sum_{n=0}^{N-1} x[n]e^{-j2\pi f_n}, \quad (4)$$

$X(f)$ can be calculated through Fast Fourier Transform (FFT) when $f\pm\alpha/2$ in the formula (3) are integer multiples of $1/N$. However, the SCF calculated in this way cannot effectively exhibit the unique characteristics of the wireless microphone signal. In view of this, the present embodiment introduces the conjugate SCF $\hat{S}_x^\alpha(f)_c$, and further proposes the augmented SCF $\hat{S}_x^\alpha(f)_a$ based on a combination of the conjugate SCF and the original SCF. The $\hat{S}_x^\alpha(f)_c$ is defined as:

$$\hat{S}_x^\alpha(f)_c = \frac{1}{MN} \sum_{k=-(M-1)/2}^{(M-1)/2} X\left(f + \frac{k}{N} + \frac{\alpha}{2}\right) \cdot X^*\left(f - \frac{k}{N} - \frac{\alpha}{2}\right), \quad (5)$$

The resulting augmented SCF $\hat{S}_x^\alpha(f)_a$ is defined as:

$$\hat{S}_x^\alpha(f)_a = \kappa_1 \hat{S}_x^\alpha(f)|_{\alpha=0} + \kappa_2 \hat{S}_x^\alpha(f)_c|_{\alpha\neq 0} \quad (6)$$

The augmented SCF of the wireless microphone signal has different characteristics from that of the sine continuous wave signal. To quantify the differences, the following statistic may be used:

$$T_p = 1 - \frac{|\Psi| \sum_{\alpha \in \Omega} |\hat{S}_x^\alpha(f)_a|\Big|_{f=0}}{|\Omega| \sum_{f \in \Psi} |\hat{S}_x^\alpha(f)_a|\Big|_{\alpha=0}} \quad (7)$$

where $\Psi$ represents the range of frequency $f$ in $|\hat{S}_x^{\alpha=0}(f)_a|$, $\Omega$ represents the range of cyclic frequency $\alpha$ in $|\hat{S}_x^\alpha(f=0)_a|$. In the present method, it is not necessary to calculate amplitudes of the SCF over the entire $(\alpha, f)$ plane. The statistic may be calculated with amplitudes of the augmented SCF at a finite set of frequencies, which reduces computation complexity.

For sine continuous wave signal, $T_p$ tends to be small while for wireless microphone signals, $T_p$ tends to large. The decision threshold $\gamma$ at a specific false alarm rate may be obtained by simulation using Monte Carlo method. With a given threshold $\gamma$, the decision rule is as follows: narrowband interference signal if $T_p \leq \gamma$, otherwise wireless microphone signal (8)

Below, the principle and function of the method of the present embodiment will be explained in connection with the figures.

Embodiment 1

The present embodiment illustrates a system simulation for the method for detecting wireless microphone signals based on the augmented SCF. The simulation is performed in a MATLAB environment, and includes the following specific steps:

1. generate wireless microphone signal $x[n], n=1, 2, \ldots, N-1$ with the formula (1), and apply a FFT to the signal to obtain corresponding frequency-domain sequence $X[K]$, $K=1, 2, \ldots, N-1$;

2. select appropriate frequency and cyclic frequency ranges $\Psi$ and $\Omega$, and calculate the augmented SCF in the selected ranges according to the formula (6);

3. calculate a statistic with the formula (7), compare the statistic with a pre-set threshold, and make decision according to the decision rule of expression (8).

The threshold may be calculated using Monte Carlo method to obtain the statistical distribution of the statistic of the sine continuous wave signal at different SNRs, and then obtaining the threshold at a given false alarm rate.

Figure 2:
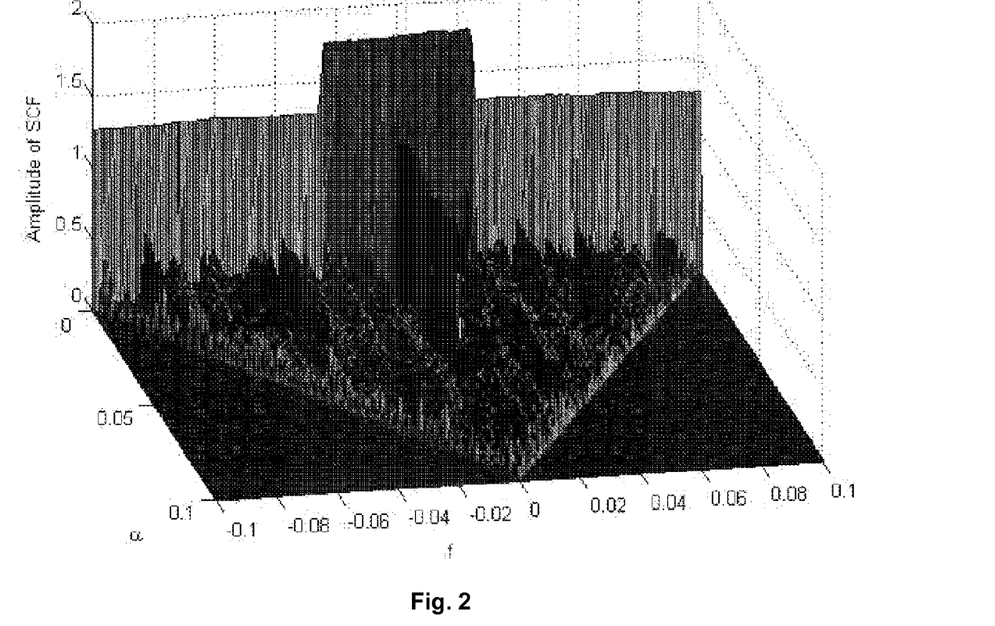
FIG. 2 is a 3-Dimensional (3D) diagram showing the amplitude of an augmented spectral correlation function for a wireless microphone signal created by MATLAB simulation in Embodiment 1 of the present invention, where β=5,SNR=−17, $\kappa_1$=0.1, $\kappa_2$=1.
Figure 3:
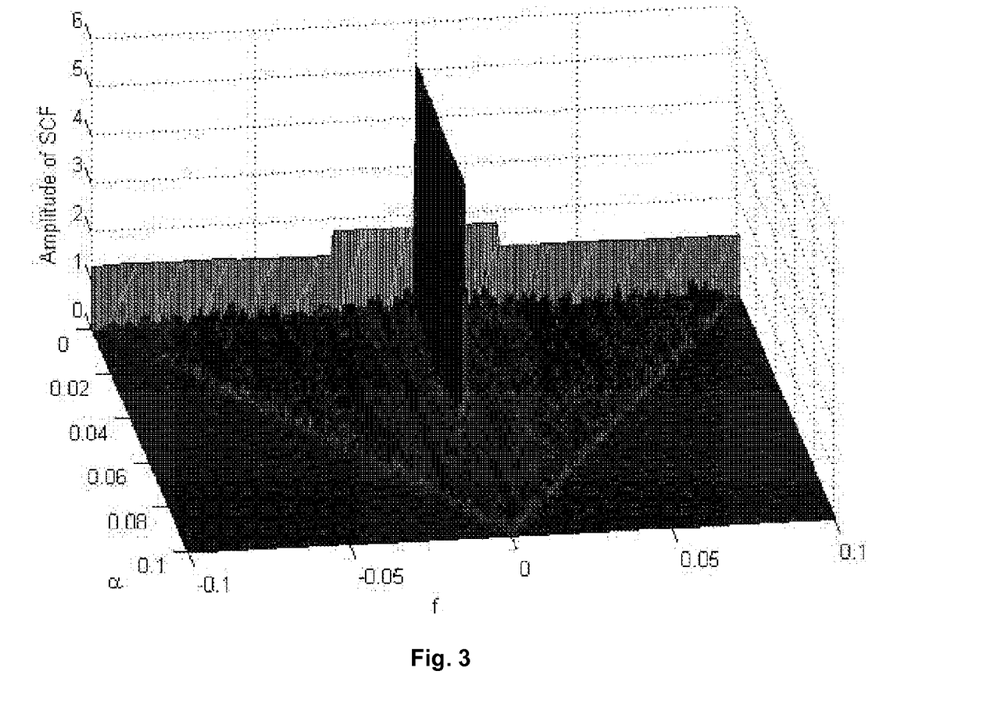
FIG. 3 is a 3D diagram showing the amplitude of an augmented spectral correlation function for a continuous-wave narrowband interference created by MATLAB simulation in Embodiment 1 of the present invention, where SNR=−17, $\kappa_1$=0.1, $\kappa_2$=1.

FIGS. 2 and 3 depict the 3D diagrams of the augmented SCFs for wireless microphone signal and sine continuous wave signal, respectively. The differences can be noticed visually in that the wireless microphone signal tends to have larger SCF magnitudes compared with the conjugate SCF at $f=0$, while the sine continuous wave signal shows an opposite behavior.

Figure 4:
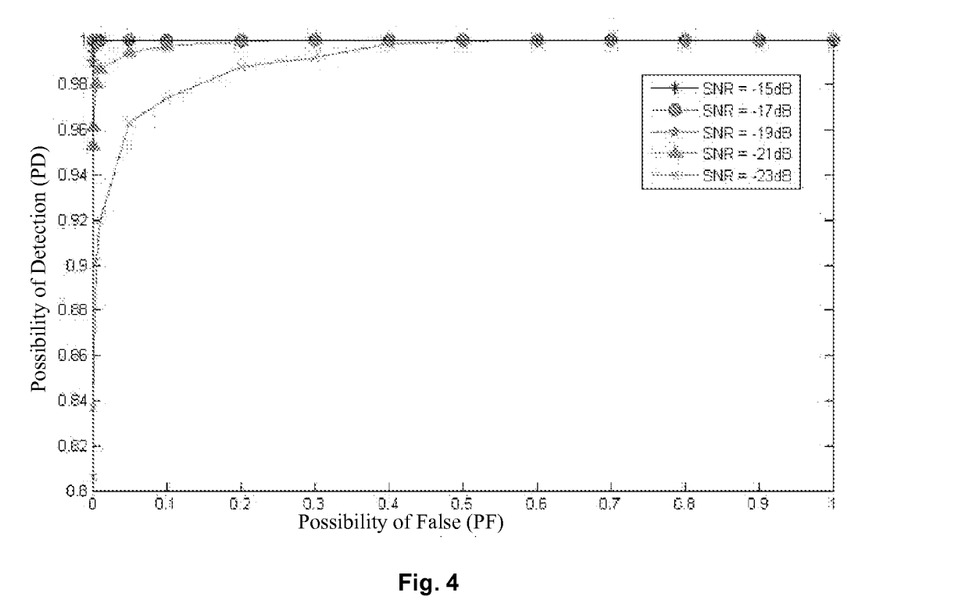
FIG. 4 is a ROC graph showing performances of the sensing method based on the augmented spectral correlation function in Embodiment 1 of the present invention, with β=2 and different SNRs.
Figure 5:
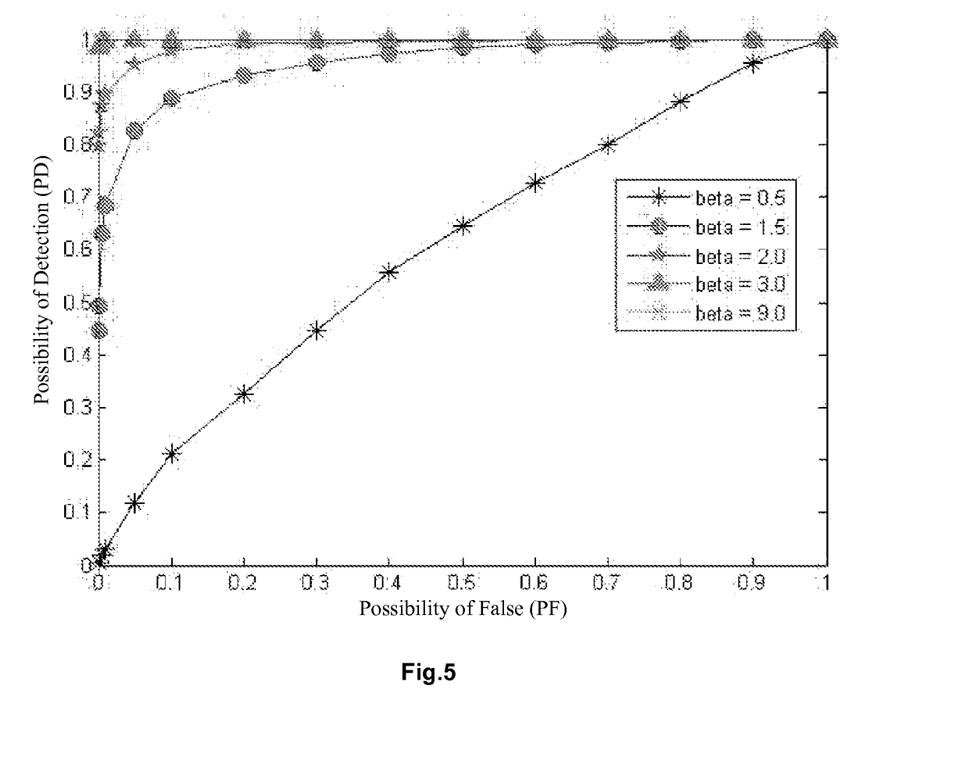
FIG. 5 is a ROC graph showing performances of the sensing method based on the augmented spectral correlation function in Embodiment 1 of the present invention, with SNR=−23 and different βs.

FIGS. 4 and 5 exhibit performances of wireless microphone signal detection method based on the augmented SCF with different parameters. It can be seen that for wireless microphone signals with SNR higher than −23 dB and β greater than 2, the false alarm rate is very low.

Embodiment 2

Figure 6:
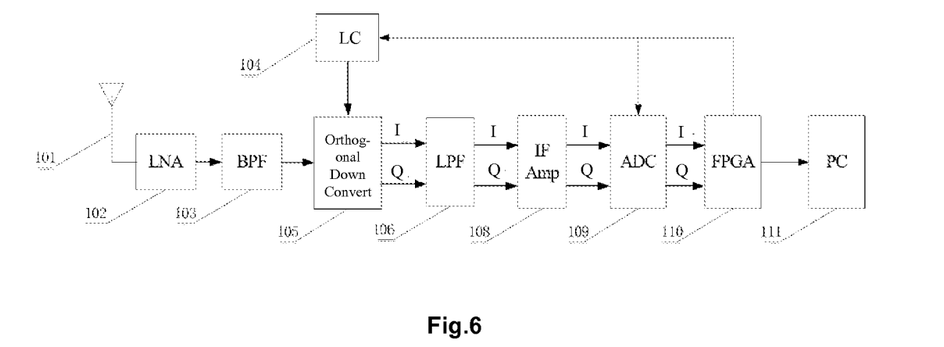
FIG. 6 is a schematic diagram of system architecture 1 for a method for detecting a wireless microphone signal based on the augmented spectral correlation function in Embodiment 2 of the present invention.
Figure 7:
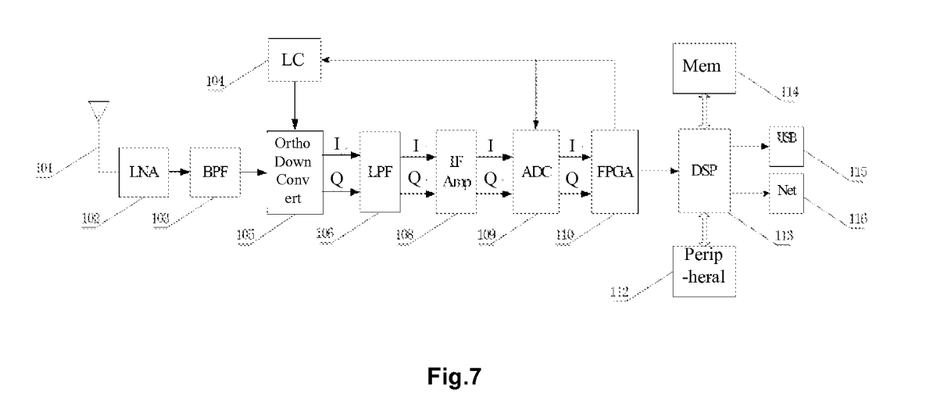
FIG. 7 is a schematic diagram of system architecture 2 for a method for detecting a wireless microphone signal based on the augmented spectral correlation function in Embodiment 2 of the present invention.

The present embodiment illustrates a system implementation for the method for detecting a wireless microphone signal based on a cycle map. The structure of the system implementation is shown in FIG. 6. The signals received by the antenna module 101 are firstly sent to the low noise amplifier (LNA) 102. The amplified signals are passed through the band-pass filter (BPF) 103 whose bandwidth may be adjusted as required. Then, the filtered signals are provided to the orthogonal down-converter 105 where performs the orthogonal down-conversion with a local oscillator 104 frequency of the desired TV band to obtain I and Q signals. The two signals are passed through a specific bandwidth low-pass filter (LPF) 106 and the intermediate frequency amplifier (IF Amp) 107, respectively. And then the I and Q signals that come from the IF Amp are sent to the analog-to-digital converter (ADC) 109. Finally, the two digital signals that come from the ADC 109 are provided to the FPGA 110, which accomplishes the signal preprocessing operations, such as receiving, down-sampling, down-converting, IQ combining and storing, thus obtaining the time-domain digital signals required for detection. With the help of USB port, the signals are sent to PC for executing the frequency-domain microphone sensing approach, and then we obtain the current state of the TV band based on the decision results. Different down-converting frequencies and sampling rates may be controlled via the feedback loop from the FPGA to the local oscillator and the ADC, respectively. In addition, the system structure 2 as shown in FIG. 7 may be used. Compared to structure 1, structure 2 replaces the PC 111 block with a block having a core of DSP 113. The block sends the data that come from the FPGA 110 to the data memory 114 via an interface like EMIF port. Then, DSP 113 reads the data from the memory 114 in real-time to execute the frequency-domain microphone sensing approach and provide the decision result. The decision result can be sent to the peripheral device 112 coupled to the DSP or transmitted to some other devices via the interfaces, such as USB port 115, or network interface 116.

The algorithm test based on the structure 1 includes the following steps:

1) select a desired TV band, and generating the wireless microphone signal and sinusoidal continuous wave at different frequencies by a wireless microphone signal generator and a signal generator, respectively;

2) acquire M segments of time-domain digital signals by using the system structure of FIG. 6, and each segment having a duration of t ms;

3) process the acquired data in the PC by using the frequency-domain microphone sensing approach.

The algorithm test based on the structure 2 includes the following steps:

1) select a desired TV band, and generating the wireless microphone signal and sinusoidal continuous wave at different frequencies by a wireless microphone signal generator and a signal generator, respectively;

2) acquire M segments of time-domain digital signals by using the system structure of FIG. 7, and each segment having a duration of t ms;

3) process the acquired data in the DSP chip by using the system structure of FIG. 7, and each segment having a duration of t ms.

Figure 8:
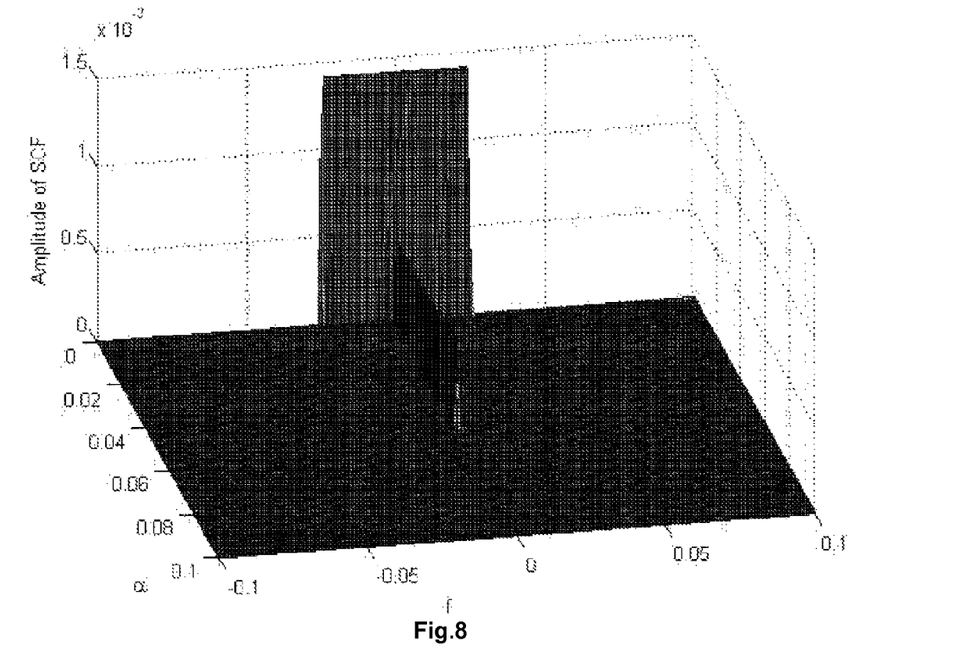
FIG. 8 is a 3D diagram showing the amplitude of the augmented spectral correlation function computed with Formula (6) for a wireless microphone signal captured through the experimental flow depicted in FIG. 6 in Embodiment 2 of the present invention.
Figure 9:
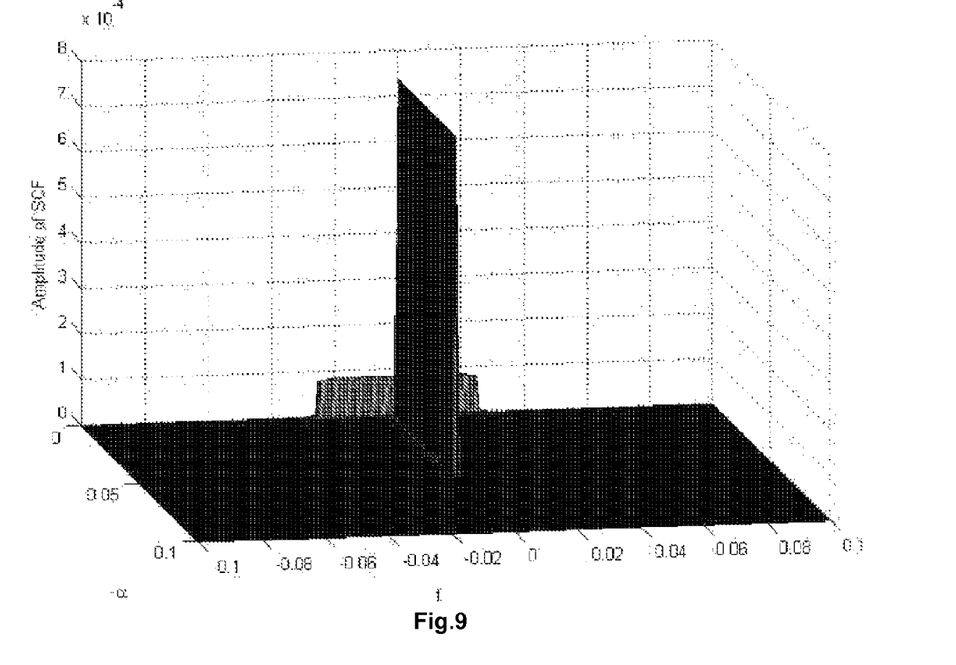
FIG. 9 is a 3D diagram showing the amplitude of the augmented spectral correlation function computed with Formula (6) for a narrowband interference captured through the experimental flow depicted in FIG. 6 in Embodiment 2 of the present invention.

FIGS. 8 and 9 exhibit 3D diagrams of amplitudes of the augmented SCF for the wireless microphone signal and the narrowband interference, respectively, in the above tests. The results of the tests are substantially consistent with the results of the system simulations.

According to the embodiments of the present invention, the method for detecting wireless microphone signals based on the augmented SCF can effectively distinguish narrowband interferences from wireless microphone signals. Thus, the present invention overcomes the difficulty in sensing TV white space, namely, the inability of most existing detection methods to effectively distinguish between narrowband interferences and wireless microphone signals. Meanwhile, the detection method has low algorithm complexity and is easy to implement in real systems Embodiments of the present invention further provide an apparatus for detecting a wireless microphone signal based on an enhanced SCF. The apparatus includes an antenna module, a LNA, a BPF, a down-converter for converting the received signals to an intermediate or base frequency, a LPF, an ADC and a time-domain signal preprocessing module. The output of the antenna module is connected to the input of the LNA. The output of the LNA is connected to the input of the BPF. The output of the BPF is connected to the input of the down-converter. The output of the down-converter is connected to the input of the LPF. The output of the LPF is connected to the input of the ADC, and the output of the ADC is connected to the input of the time-domain signal preprocessing module.

Preferably, the antenna module may be a VHF or UHF band receiving antenna. The down-converter may set the frequency of a local oscillator according to the desired TV band to be detected, and convert the received signals down to the intermediate or base frequency.

Preferably, the bandwidth of the LPF should be equal to or greater than half bandwidth of a TV band. The voltage or current value that comes from the gain controller may be manually or automatically adjusted to the voltage or current required by the ADC. With the help of a programmable chip, the time-domain signal preprocessing module may accomplish two major functions, i.e., on one hand, processing like receiving, down-sampling, down-converting, combining and storing of the I and Q signals, and on the other hand, providing control signals required for other modules, such as the local oscillator, the ADC, and the USB chip.

The functions of the respective components in the apparatus for detecting a wireless microphone signal based on the augmented SCF have been specifically described in the foregoing method embodiments, and thus detailed description therefore will be omitted.

The foregoing illustrates preferred embodiments of the present invention. However, the scope of the present invention is not limited to the above embodiments. Modifications and alternatives can be made by those skilled in the art without departing from the scope of the present invention. These modifications and alternatives are to be encompassed by the scope of the present invention which is defined by the claims as attached.

What is claimed is:

1. A method, implemented by a computing device, for detecting a wireless microphone signal in digital TV white space based on an augmented spectral correlation function (SCF), characterized in that the method comprises:

acquiring, by the computing device, a preprocessed time-domain digital signal x[n] in a particular TV band, calculating a SCF $\hat{S}_x^\alpha(f)$ of the digital signal x[n], calculating a conjugate SCF $\hat{S}_x^\alpha(f)_c$ of the digital signal x[n], and calculating the augmented SCF $\hat{S}_x^\alpha(f)_a$ of the digital signal x[n]; and calculating, by the computing device and using the augmented SCF $\hat{S}_x^\alpha(f)_a$, a statistic $T_p$ of the digital signal x[n], simulating or calculating a threshold γ with a predetermined method, and determining whether the acquired digital signal x[n] is a wireless microphone signal based on a result of a comparison between the statistic $T_p$ and the threshold γ.

2. The method of claim 1, characterized in that the simulating or calculating the threshold γ with a predetermined method comprises simulating the threshold with Monte Carlo methods, or setting the threshold based on actual data.

3. The method of claim 1, characterized in that the determination based on the comparison result of $T_p$ and γ indicates narrowband interferences if $T_p \leq \gamma$, otherwise wireless microphone signals.

4. The method of claim 1, further comprising sensing, by the computing device, TV white space in the particular TV band based on determining whether the acquired digital signal x[n] is a wireless microphone signal.

5. The method of claim 1, wherein acquiring the preprocessed time-domain digital signal x[n] further includes:

obtaining a digital signal by an antenna module;

providing an output of the antenna module to a low noise amplifier (LNA);

providing an output of the LNA to a band-pass filter (BPF);

providing an output of the BPF to a down-converter;

providing an output of the down-converter to a low-pass filter (LPF);

providing an output of the LPF to an analog-to-digital converter (ADC);

providing an output of the ADC to a time-domain signal preprocessing module; and acquiring the pre-processed time-domain digital signal x[n] from the time-domain signal preprocessing module.

6. A computing device for sensing TV white space, comprising:

a memory; and a digital signal processor configured to detect a wireless microphone signal based on an augmented spectral correlation function (SCF) by:

acquiring a preprocessed time-domain digital signal x[n] in a particular TV band, calculating a SCF $\hat{S}_x^\alpha(f)$ of the digital signal x[n], calculating a conjugate SCF $\hat{S}_x^\alpha(f)_c$ of the digital signal x[n], and calculating the augmented SCF $\hat{S}_x^\alpha(f)_a$ of the digital signal x[n]; and calculating, by the computing device and using the augmented SCF $\hat{S}_x^\alpha(f)_a$, a statistic $T_p$ of the digital signal x[n], simulating or calculating a threshold γ with a predetermined method, and determining whether the acquired digital signal x[n] is a wireless microphone signal based on a result of a comparison between the statistic $T_p$ and the threshold $\gamma$.

7. The computing device of claim 6, characterized in that the digital signal processor is configured to simulate the threshold with Monte Carlo methods, or set the threshold based on actual data.

8. The computing device of claim 6, characterized in that the digital signal processor is configured to determine that the comparison result of $T_p$ and $\gamma$ indicates narrowband interferences if $T_p \leq \gamma$, otherwise wireless microphone signals.

9. The computing device of claim 6, characterized in that the digital signal processor is further configured to sense TV white space in the particular TV band based on determining whether the acquired digital signal x[n] is a wireless microphone signal.

10. The computing device of claim 6, wherein the computing device further comprises:
an antenna module;
a low noise amplifier (LNA);
a band-pass filter (BPF);
a down-converter for converting received signals to an intermediate or base frequency;
a low-pass filter (LPF);
an analog-to-digital converter (ADC); and
a time-domain signal preprocessing module,
wherein a signal output of the antenna module is coupled to an input of the LNA, an output of the LNA is coupled to an input of the BPF, an output of the BPF is coupled to an input of the down-converter, an output of the down-converter is coupled to an input of the LPF, an output of the LPF is coupled to an input of the ADC, and an output of the ADC is coupled to an input of the time-domain signal preprocessing module,
and wherein the digital signal processor is configured to acquire the preprocessed time-domain digital signal x[n] from an output of the time-domain preprocessing module.

* * * * *